United States Patent [19]

Everest et al.

[11] 3,752,581
[45] Aug. 14, 1973

[54] RANGEFINDER

[75] Inventors: Frank Geoffrey Everest, Stevenage, Hertfordshire; Thomas Patrick Veasey, Hitchin, Hertfordshire, both of England

[73] Assignee: British Aircraft Corporation Limited, London, England

[22] Filed: Oct. 5, 1971

[21] Appl. No.: 186,629

[30] Foreign Application Priority Data
Oct. 14, 1970 Great Britain.................. 48,764/70

[52] U.S. Cl............................ 356/5, 356/4, 343/13, 343/5 DP
[51] Int. Cl............................................. G01c 3/08
[58] Field of Search...................... 356/4, 5; 343/13, 343/5 DP; 340/1 C

[56] References Cited
UNITED STATES PATENTS
3,315,258   4/1967   Dillard.............................. 343/5 DP
3,666,367   5/1972   Farnsworth et al...................... 356/5

Primary Examiner—Benjamin A. Borchelt
Assistant Examiner—S. C. Buczinski
Attorney—Cushman, Darby & Cushman

[57] ABSTRACT

A rangefinder which includes a transmitter for transmitting a pulse of electromagnetic energy towards a target, and a receiver for receiving reflections of that pulse, in which means is provided for ensuring that although reflections may be received from light reflecting media located between the transmitter and the target, only the last received reflection, which is from the target, is used to provide the indication of the range of the target.

8 Claims, 1 Drawing Figure

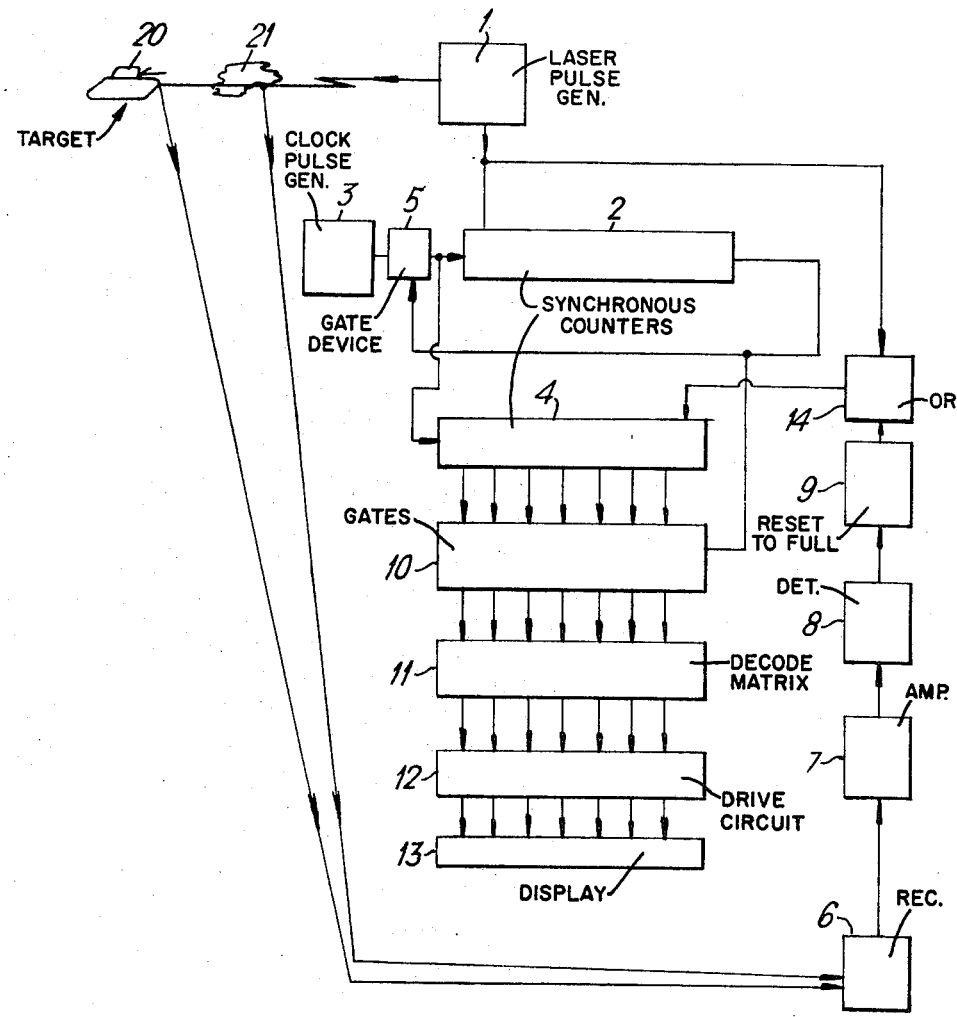

RANGEFINDER

This application relates to rangefinders and particularly to rangefinders which employ a transmitter to transmit one or a number of pulses of electromagnetic energy at a target, and a receiver to receive energy reflected from the target and provide an indication of the range of the target by measuring the time taken between the transmission of a pulse and the receipt of the reflection from the target.

In clear air conditions such rangefinders provide an accurate indication of the range of the target. However, if a patch of light-reflecting medium such as smoke, fog, etc., should be between the rangefinder and the traget, the receiver will receive more than one reflection from a single transmitted pulse and no clear indication of the range of the target will be given.

The object of the present invention is to provide a rangefinder which will give an accurate indication of the range of a target despite the existence of light-reflecting media between the rangefinder and the target.

A rangefinder according to the present invention includes an emitter for emitting a pulse of electromagnetic energy, a clock pulse generator, a forwardly counting counter for counting pulses from the clock pulse generator, a backwardly counting counter having a capacity identical to the forwardly counting counter for deducting from a full count the pulses from the clock pulse generator, means for stopping the counters when the forwardly counting counter is filled, a receiver for receiving reflections of the said pulse of electromagnetic energy, means for resetting the backwardly counting counter to full each time that a reflection is received by the receiver, means for passing the count existing in the backwardly counting counter to a store when the forwardly counting counter fills up, and means for presenting a visual display of the number received by the store.

In a preferred form of the invention the emitter is a laser light transmitter.

In one embodiment of the invention which will now be described by way of example with reference to the accompanying drawing, a laser pulse generator 1 forming part of a rangefinder is aimed at a target 20 and the generator 1 emits one or more short pulses of light at the target. At the beginning of each pulse, a first synchronous counter 2 is reset to zero and commences counting the clock pulses emitted by a 15 MH$_z$ clock pulse generator 3 which also supplies pulses to a second synchronous counter 4 through a gating device 5. The second counter 4 is reset to full by an OR gate 14. Both counters 2 and 4 have a capacity of 1,000 and counter 2 counts upwardly from zero whilst counter 4 begins at 1,000 and counts downwardly.

Each time that a portion of a transmitted light pulse is reflected from any light-reflecting media such as fog, smoke, foliage, etc., 21, in the patch of the light pulse as it travels to the target 20, the reflected light is received by a receiver 6 which supplies an electrical output signal to an amplifier 7 and threshold detector 8. The trailing edge of the output signal causes the detector 8 to drive a reset-to-full device 9 which causes the OR gate 14 to reset the counter 4 to full (i.e. 1,000). The receiver 6 may receive several such reflected signals resulting from a single pulse of light transmitted by the laser pulse generator 1. The last received of these reflected signals will always be from the target since the light pulse from the generator 1 will always be stopped by the target.

On transmission of a single pulse from the generator 1, counter 2 begins to fill up from empty and counter 4 begins to unload from full. A reflected light signal received by the receiver 6 then causes the counter 4 to be reset to full and to recommence counting down from full. The counter 2, however, continues to count upwardly. Receipt of further reflected light signals by receiver 6 cause the counter 4 to be reset to full each time and to recommence counting from full each time. The last received reflected light signal is from the target 20.

When the counter 2 is filled, a "stop counting" pulse is generated which stops further pulses produced by the clock pulse generator 3 from passing to counters 2 and 4 via the gate 5, and both counters then stop. The count number in counter 4 is a direct measure of the range, and the "stop-counting" pulse is used to transfer this number to a decoding matrix 11 via gates 10. A combined binary coded decimal decoder and drive circuit 12 decodes the count stored in matrix 11 and drives the appropriate displays of a visual display device 13 to indicate the range.

The measure of the range to the desired target is the time between the start of counting by counter 2 and the receipt of the last reflected pulse in receiver 6. Counter 4 has been counting down from the maximum count since the receipt of the last signal pulse and so, when counter 2 fills up, the counter 4 contains a count equivalent to the time elapsed between the transmission of the laser pulse by generator 1 and the receipt of the last received light pulse by the receiver 6.

The decimal count for the 15 MH$_z$ clock input rate is equivalent to the range of target in tens of metres, and for a maximum count of 1,000, the maximum range is 10 KM. In order to obtain a range in terms of feet, a $\overline{492.125984}$ MH$_z$ clock pulse generator would be used, but a maximum count of 10,000 or 1,000,000 would be necessary to indicate ranges of 2 miles and 20 miles respectively.

For adequate accuracy of rangefinding the laser pulse length for a 10 metre resolution should be less than 10 metres long, i.e. less than 30 nS in duration. Similarly, if a resolution of 1 foot accuracy is required, the pulse length should have a duration of about 1 nS.

A feature of the present invention is that each of the blocks shown in the accompanying drawing is a standard circuit which may be bought as an "off-the-shelf" item.

We claim:

1. A rangefinder comprising an emitter for emitting a pulse of electromagnetic energy, a clock pulse generator, a forwardly counting counter for counting pulses from the clock pulse generator, a backwardly-counting counter having a capacity identical to that of the forwardly counting counter for deducting from a full count the pulses from the clock pulse generator, means for stopping the counters when the forwardly counting counter is filled, a receiver for receiving reflections of the said pulse of electromagnetic energy, means for resetting the backwardly counting counter to full each time that a reflection is received by the receiver, means for passing the count existing in the backwardly counting counter to a store when the forwardly counting counter fills up, and means for presenting a visual display of the number received by the store.

2. A rangefinder comprising a laser for emitting a pulse of laser light, a clock pulse generator, a forwardly counting counter for counting pulses from the clock pulse generator, a backwardly-counting counter having a capacity identical to that of the forwardly counting counter for detecting from a full count the pulses from the clock pulse generator, means for stopping the counters when the forwardly counting counter is filled, a receiver for receiving reflections of the said pulse of light, means for resetting the backwardly counting counter to full each time that a reflection is received by the receiver, means for passing the count existing in the backwardly counting counter to a store when the forwardly counting counter fills up and means for presenting a visual display of the number received by the store.

3. A rangefinder as claimed in claim 1 in which the means for stopping the counters when the forwardly counting counter is filled comprises a gating circuit.

4. A rangefinder as claimed in claim 1, in which the means for resetting the backwardly counting counter to full each time that a reflection is received by the receiver comprises a threshold detector which detects the trailing edge of a signal from the receiver and drives a resetting device and an OR gate.

5. A rangefinder as claimed in claim 1, in which the means for passing the count existing in the backwardly counting counter to the store when the forwardly counting counter fills up comprises a plurality of gating circuits actuated by the forwardly counting counter.

6. A rangefinder as claimed in claim 2 in which the means for stopping the counters when the forwardly counting counter is filled comprises a gating circuit.

7. A rangefinder as claimed in claim 2, in which the means for resetting the backwardly counting counter to full each time that a reflection is received by the receiver comprises a threshold detector which detects the trailing edge of a signal from the receiver and drives a resetting device and an OR gate.

8. A rangefinder as claimed in claim 2, in which the means for passing the count existing in the backwardly counting counter to the store when the forwardly counting counter fills up comprises a plurality of gating circuits actuated by the forwardly counting counter.

* * * * *